United States Patent
Shaw et al.

(10) Patent No.: US 11,113,012 B2
(45) Date of Patent: Sep. 7, 2021

(54) REPROCESSING OF PAGE STRIPS RESPONSIVE TO LOW MEMORY CONDITION

(71) Applicant: Hewlett-Packard Development Company, L.P., Spring, TX (US)

(72) Inventors: Mark Shaw, Boise, ID (US); Kurt Robert Bengston, Boise, ID (US); Dominic Wayda, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/605,016

(22) PCT Filed: Mar. 28, 2018

(86) PCT No.: PCT/US2018/024817
§ 371 (c)(1),
(2) Date: Oct. 14, 2019

(87) PCT Pub. No.: WO2019/190498
PCT Pub. Date: Oct. 3, 2019

(65) Prior Publication Data
US 2021/0132871 A1    May 6, 2021

(51) Int. Cl.
*G06F 3/12* (2006.01)
*G06F 12/0882* (2016.01)

(52) U.S. Cl.
CPC ............ *G06F 3/122* (2013.01); *G06F 3/126* (2013.01); *G06F 3/1219* (2013.01); *G06F 3/1241* (2013.01); *G06F 12/0882* (2013.01)

(58) Field of Classification Search
CPC ........ G06F 3/122; G06F 3/1241; G06F 3/126; G06F 12/0882; G06F 3/1219; H04N 1/2137; G06K 15/1817; G06K 15/1861; G06K 15/1881
See application file for complete search history.

(56) References Cited

U.S. PATENT DOCUMENTS

| | | |
|---|---|---|
| 5,479,587 A | 12/1995 | Campbell et al. |
| 5,524,186 A * | 6/1996 | Campbell ............... G06K 15/02 358/1.16 |
| 5,940,585 A | 8/1999 | Vondran, Jr. et al. |
| 6,130,759 A | 10/2000 | Blair |
| 6,563,513 B1 | 5/2003 | Yu et al. |
| 6,583,887 B1 * | 6/2003 | Clouthier ................. H04N 1/41 358/1.15 |
| 7,062,100 B2 | 6/2006 | Ebner et al. |
| 7,969,616 B2 | 6/2011 | Ota |
| 8,437,043 B2 | 5/2013 | Ebner et al. |

(Continued)

*Primary Examiner* — Juan M Guillermety
(74) *Attorney, Agent, or Firm* — Michael A Dryja

(57) ABSTRACT

Strips of a page are processed according to a rendering technique, compressed, and stored in a memory buffer until a low memory condition of the buffer occurs. When the low memory condition occurs, the strips that are already stored in the buffer are decompressed, processed according to a memory utilization reduction technique, compressed, and stored in the memory buffer. Strips that are not yet already stored in the buffer when the low memory condition occurs are processed according to the rendering technique and then according to the memory utilization reduction technique before being compressed and stored in the memory buffer.

12 Claims, 6 Drawing Sheets

(56) References Cited

U.S. PATENT DOCUMENTS

| | | |
|---|---|---|
| 9,641,724 B1 | 5/2017 | Palanivel et al. |
| 2001/0015820 A1* | 8/2001 | Conrad ................. G06K 15/00 |
| | | 358/1.15 |
| 2002/0063894 A1 | 5/2002 | Campbell et al. |
| 2002/0093669 A1* | 7/2002 | Campbell ............. G06K 15/02 |
| | | 358/1.9 |
| 2003/0043412 A1 | 3/2003 | Roylance |
| 2010/0182637 A1* | 7/2010 | Tamura ................. H04N 1/405 |
| | | 358/1.15 |
| 2011/0075160 A1 | 3/2011 | Hu |
| 2011/0199633 A1 | 8/2011 | Nguyen |
| 2015/0116778 A1* | 4/2015 | Itami ....................... G06F 3/122 |
| | | 358/2.1 |
| 2018/0082160 A1* | 3/2018 | Nakane .............. G06K 15/1851 |
| 2018/0181846 A1* | 6/2018 | Koziarz ............. G06K 15/1817 |
| 2018/0225224 A1* | 8/2018 | Senior ................ G06F 12/0897 |

* cited by examiner

REPROCESSING OF PAGE STRIPS RESPONSIVE TO LOW MEMORY CONDITION

BACKGROUND

Printing devices include standalone printers, as well as all-in-one (AIO) and multifunction printer (MFP) devices that include functionality like scanning, copying, and/or faxing functionality in addition to printing functionality. Different types of printing devices employ different types of colorants, such as ink or toner, to form images on print media like paper. For example, inkjet-printing devices eject ink onto print media, whereas laser-printing devices apply toner onto print media. Printing devices can be full-color printing devices, such that they have colorants corresponding to the colors of a color space like the cyan-magenta-yellow-black (CMYK) color space to print full-color images. Printing devices may instead be monochromatic printing devices, such that they typically have just black colorant to print black- and white images.

DETAILED DESCRIPTION

Figure 1:
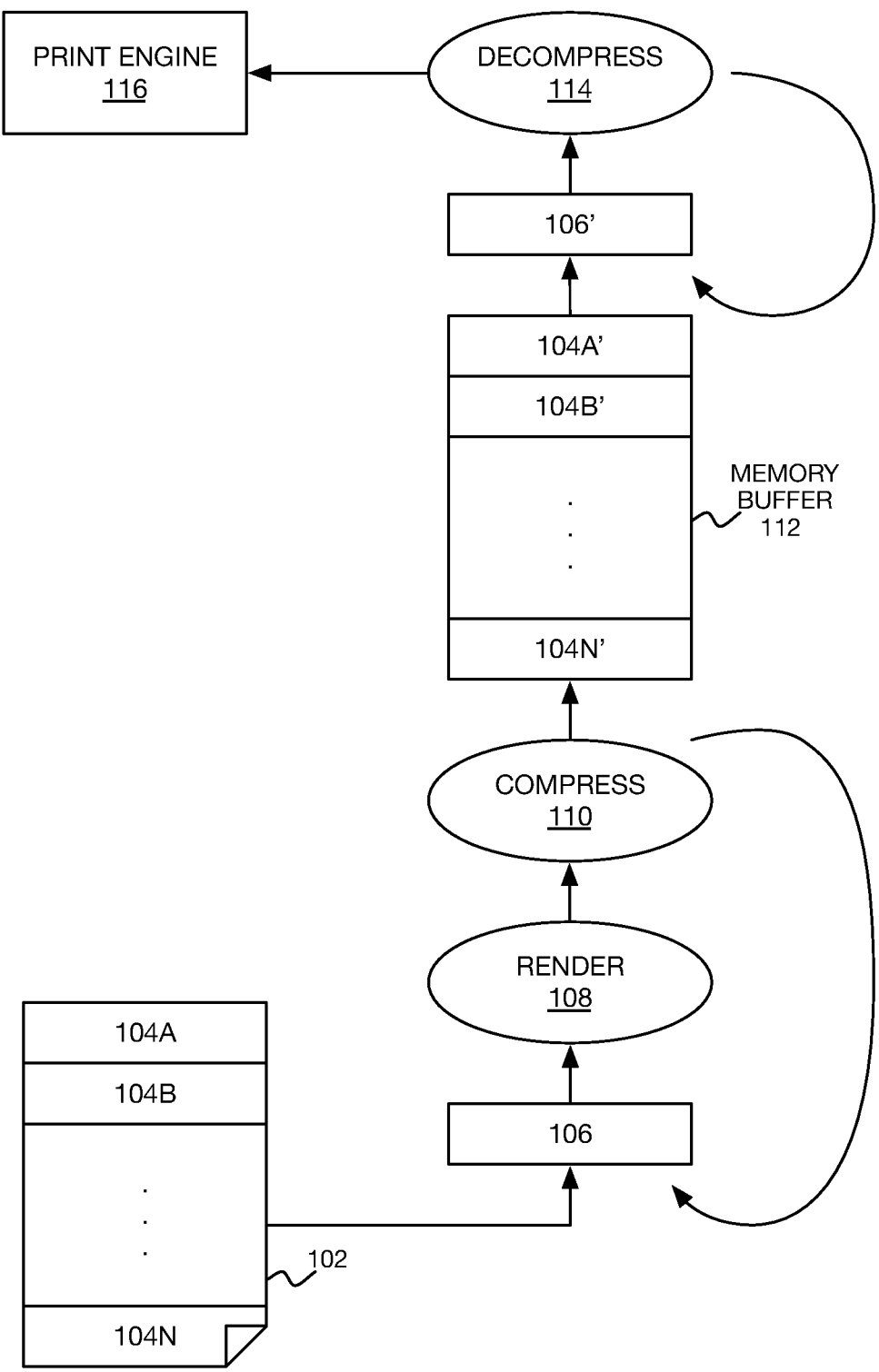
FIG. 1 is a diagram of an example process flow in which a page is printed, when no low memory condition occurs.

As noted in the background section, printing devices can include laser-printing devices that apply toner onto print media like paper, and which can be monochromatic printing devices that form black-and-white images on the print media. In general, a laser-printing device processes an incoming image, or page, to be output onto a side of print media sheet before the laser print engine applies toner onto the sheet according to the processed page. This process is known as rendering, and transforms the incoming image into a format that is compatible with the print engine. For example, an incoming 600×600 dots per inch (dpi) eight bit-per-pixel (bpp) image may be transformed via halftoning into a 600×400 dpi two-bpp image that the print engine can intrinsically print.

Unlike other print technologies like inkjet printing, in laser printing, once the print engine has begun to print on a sheet of print media, it cannot pause mid-sheet to wait for additional rendered data of the page being printed. As the print engine outputs toner onto the print media to print a page onto print media, in other words, rendering of the image has to keep up to provide rendered data of the page to the print engine. If rendering of the current page being printed falls behind the print engine's outputting of toner, the print engine cannot pause to wait for rendering to catch up.

The print engine can, however, pause between pages to ensure that when the engine begins printing a page onto a sheet of print media, the print engine will have rendered data of the page as the engine outputs toner onto the sheet. However, pausing between pages in this manner can reduce print speed. That is, a laser print engine may have a maximum throughput at which the engine can output toner onto sheets of print media, but if the print engine has to wait before printing a given page, then the realized print speed will be less than this maximum throughput.

To ensure that a print engine is not starved of rendered data of a page while printing the page, and to ensure that the print engine does not have to wait in-between printing pages, a memory buffer may be used to store rendered pages. The printing device thus renders incoming pages and stores them into the memory buffer, and the print engine prints the rendered pages from the buffer. However, memory can be at a premium within printing devices, particularly lower cost devices. If the amount of free space in the buffer becomes too small, print speed can be deleteriously affected.

To maximize efficient usage of a memory buffer, particularly for smaller-sized memory buffers, the rendered pages may be stored in compressed form in the memory buffer. Therefore, the printing device renders incoming pages, and compresses and stores them in the memory buffer, while the print engine prints the rendered pages from the buffer after first decompressing them. For incoming pages of typical complexity, compression can with an appropriately selected memory buffer size ensure maximum print speed. However, outlier pages of high complexity can still result in the memory buffer running out of available space, which results in the print engine having to wait between printing successive pages, thus reducing printing speed.

Techniques described herein can avoid these shortcomings. An incoming page to be printed is logically divided into (horizontal) strips. The strips are successively rendered, compressed, and stored in a memory buffer. However, if a low memory condition occurs—e.g., if there is insufficient available free space in the memory buffer to store an additional strip of the current page—then the already rendered and compressed page strips are decompressed and processed according to a memory utilization reduction technique before being recompressed and stored in the memory buffer. Subsequent strips of the page are rendered, processed according to this technique, compressed, and stored in the memory buffer.

For example, if rendering involves transforming a page strip to a 600×400 DPI two-bpp halftoned strip, the memory utilization reduction technique can involve subsequently reducing this rendered strip to a one-bpp strip. To avoid a visible artifact in the form of a banding between the page strip rendered before the low memory condition was detected and the next strip of the page, the subsequent page strips are processed in the same manner. That is, each subsequent strip is rendered as if the low memory condition had not occurred, and then is subjected to the memory utilization reduction technique, albeit without intermediate compression (and decompression).

If the low memory condition is again detected while processing the strips of a given page, another, more aggressive, memory utilization reduction technique may also be employed. The compressed strips already stored in the memory buffer can be decompressed and subjected to an additional memory utilization reduction technique, such as conversion to 300×400 DPI one-bpp strips, before being recompressed and stored back in the buffer. Subsequent strips are then also rendered, subjected to the initial memory utilization reduction technique, and then subjected to the additional memory utilization reduction technique, before being compressed and stored in the buffer (but without being compressed between the application of the two memory utilization reduction techniques).

FIG. 1 shows an example process flow for printing an incoming page 102. The incoming page 102 may be a full-color image, for instance, such as a 600×600 DPI twenty four-bpp image (i.e., an image having twenty-four bits of color depth). As another example, the incoming page 102 may be a grayscale image, such as a 600×600 DPI eight-bpp image (i.e., an image having eight bits of grayscale depth). The page 102 is divisible into page strips 104A, 104B, . . . , 104N, which are collectively referred to as the page strips 104. The page strips 104 may be horizontal page strips, as depicted in FIG. 1, and may each be of the same height, such as 48 pixels high.

The page strips 104 are successively processed in order from the first page strip 104A of the page 102 to the last page strip 104N of the page 102 before being stored in a memory buffer 112. A current page strip 106 is thus rendered (108) and compressed (110) before being stored in the memory buffer 112. Rendering of a current page strip 106 can include halftoning the strip 106 to 600×400 DPI two-bpp grayscale. As the page strips 104 are rendered and compressed, the strips are stored as the compressed rendered page strips 104A', 104B', . . . , 104N', which are collectively referred to as the compressed rendered page strips 104'.

Furthermore, once the page strips 104 of the page 102 have been respectively rendered and compressed in parts 108 and 110, and then stored in the memory buffer 112, the page 102 can actually be printed. The compressed rendered page strips 104' are successively retrieved in order from the first page strip 104A' to the last page strip 104N' from the memory buffer 112. A current compressed rendered page strip 106' is thus decompressed (114), and transmitted to a print engine 116 for printing. The print engine 116 may be a laser print engine, for instance. Usage of the memory buffer 112 can ensure that the print engine 116 realizes an actual print speed close to if not equal to its theoretical maximum.

However, the process of FIG. 1 as described assumes that there is sufficient space in the memory buffer 112 to store the page strips 104 as they are rendered and compressed. If there is insufficient space in the memory buffer 112 to store the current page strip 106 after the rendering and compression of parts 108 and 110, print speed may suffer; the rendering and compression process may have to wait until space within the buffer 112 becomes available. A low memory condition of the memory buffer 112 can therefore occur when the memory buffer 112 becomes full, or otherwise has insufficient space to store an additional compressed rendered page strip, during the process of FIG. 1.

Figure 2:
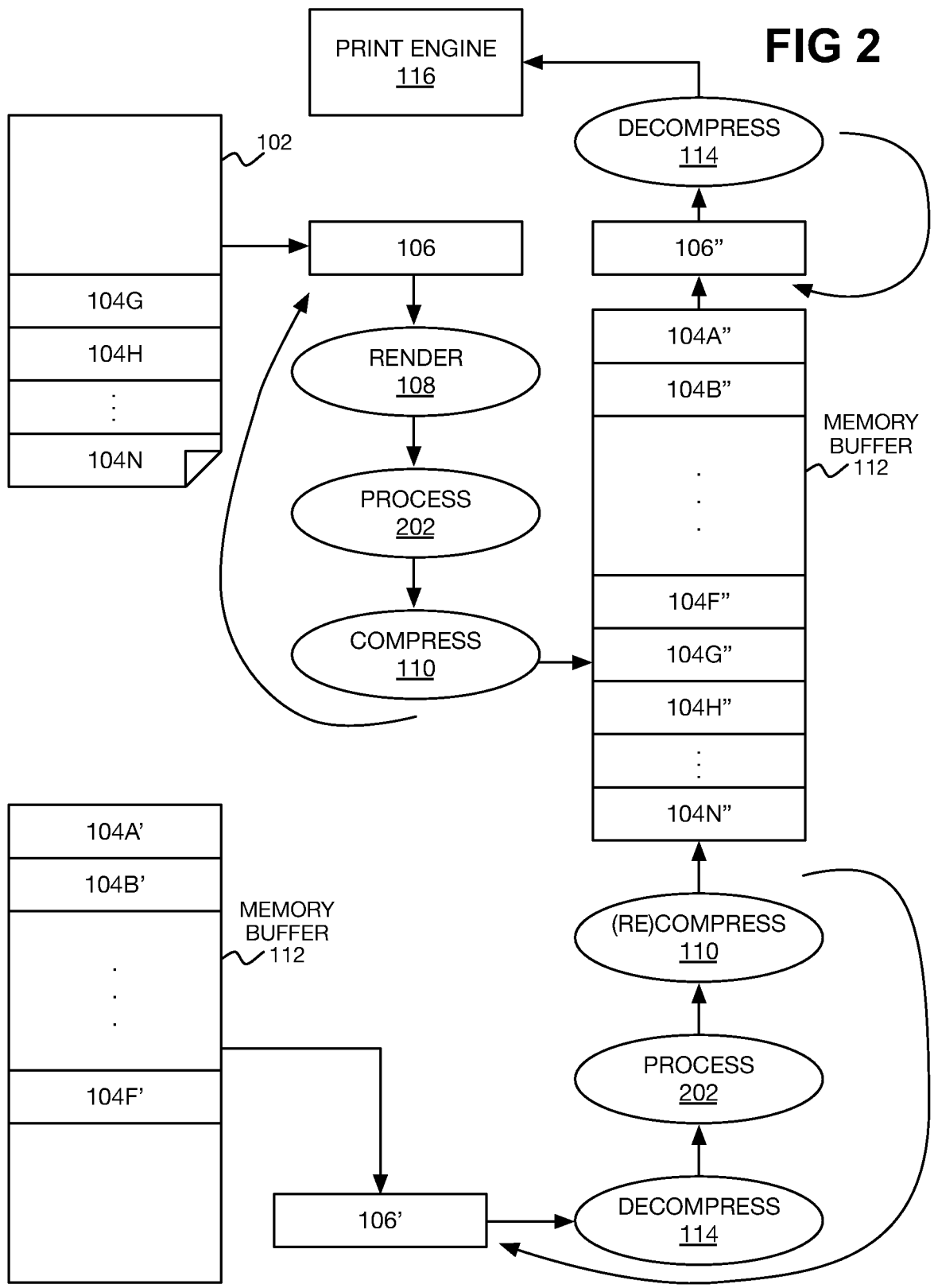
FIG. 2 is a diagram of an example process flow in which a page is printed, after a first low memory condition occurs.

FIG. 2 shows an example process flow for printing the incoming page 102 when a low memory condition of the memory buffer 112 occurs during the process of FIG. 1. In the example of FIG. 2, the memory buffer 112 has reached a low memory condition after compressed rendered page strips 104A', 104B', . . . , 104F' have been stored in the buffer 112, per the process of FIG. 1. That is, the memory buffer 112 may have insufficient available free space to store the next page strip 104G of the page 102 after or if the page strip 104G is rendered and compressed in accordance with FIG. 1.

Therefore, the already compressed rendered page strips 104A', 104B', . . . , 104F' are successively retrieved from the memory buffer 112 and subjected to additional processing, in order from the strip 104A' to the page strip 104F', before being stored back in the buffer 112. The current such compressed and rendered page strip 106' is thus retrieved from the memory buffer 112, decompressed (114), subjected to additional processing (202), and (re)compressed (110), before being stored back in the memory buffer 112. The additional processing of part 202 can include reducing the (600×400 DPI) two-bpp halftoned page strip to a (600×400 DPI) one-bpp halftoned page strip. As the page strips 104A', 104B', . . . , 104F' are decompressed, processed, and recompressed, the strips are stored as the compressed, processed, and rendered page strips 104A", 104B", . . . , 104F", respectively.

It is noted that each page strip 106', after decompression, corresponds to a page strip 106 of FIG. 1 after the strip 106 has been rendered per part 108. Therefore, the processing of part 202 is performed on a page strip after it has already been rendered. This rendered page strip undergoes additional processing in part 202 to become a processed, rendered page strip, which is then (re)compressed and stored back in the memory buffer 112. The page strip after the processing of part 202 is smaller in size, and thus takes up less space in the memory buffer 112, than before this processing.

After the page strips 104A', 104B', . . . , 104F' that were previously stored in the memory buffer 112 per FIG. 1 when the low memory condition of the buffer 112 occurred have been processed, the remaining page strips 104G, 104H, . . . , 104N of the page 102 can then be processed. The page strips 104G, 104H, . . . , 104N are successively processed in order from the page strip 104G to the page strip 104N before being stored in the memory buffer 112. The current such page strip 106 is thus rendered (108) as in FIG. 1, but before being compressed (110), is also subjected to the additional processing (202) that has been described. As the page strips 104G, 104H, . . . , 104N are so rendered, processed, and compressed, the strips are stored as the compressed, processed, and rendered page strips 104G", 104H", . . . , 104N", respectively.

It is noted, however, that the page strips 104G, 104H, . . . , 104N do not undergo compression (or decompression) between when they are rendered in part 108 and when they are processed in part 202. This is unlike the preceding page strips 104. That is, the page strips 104A', 104B', . . . , 104F' were stored in the memory buffer 112 after they were rendered in part 108 and compressed in part 110 per the process of FIG. 1; before they are processed in part 202 in the process of FIG. 2, the page strips 104A', 104B', . . . , 104F' were decompressed in part 114 in FIG. 2.

Once the page strips 104G, 104H, . . . , 104N of the page 102 have been rendered, processed, and compressed in parts 108, 202, and 110, and then stored in the memory buffer 112, the page 102 can actually be printed. The compressed, processed, and rendered page strips 104" are successively retrieved in order from the first page strip 104A" to the last page strip 104N" from the memory buffer 112. A current compressed, processed, and rendered page strip 106" is thus decompressed (114), and transmitted to the print engine 116 for printing.

The process of FIG. 2 as described assumes that, after the low memory condition of the memory buffer 112 has occurred during the process of FIG. 1 after the compressed and rendered page strip 104F' has been stored in the buffer 112, there is subsequently sufficient space to store the compressed, processed, and rendered page strips 104" as the remaining strips 104G, 104H, . . . , 104N are rendered, processed, and compressed. However, if there is insufficient space in the memory buffer 112 to store the current page strip 106 after the rendering, processing, and compression of parts 108, 202, and 110, the rendering, processing, and compression process may have to wait until space within the buffer 112 becomes available. A second low memory condition of the memory buffer 112 can therefore occur when the memory buffer 112 becomes full, or otherwise has insufficient space to store an additional compressed, processed, and rendered page strip, during the process of FIG. 2.

Figure 3:
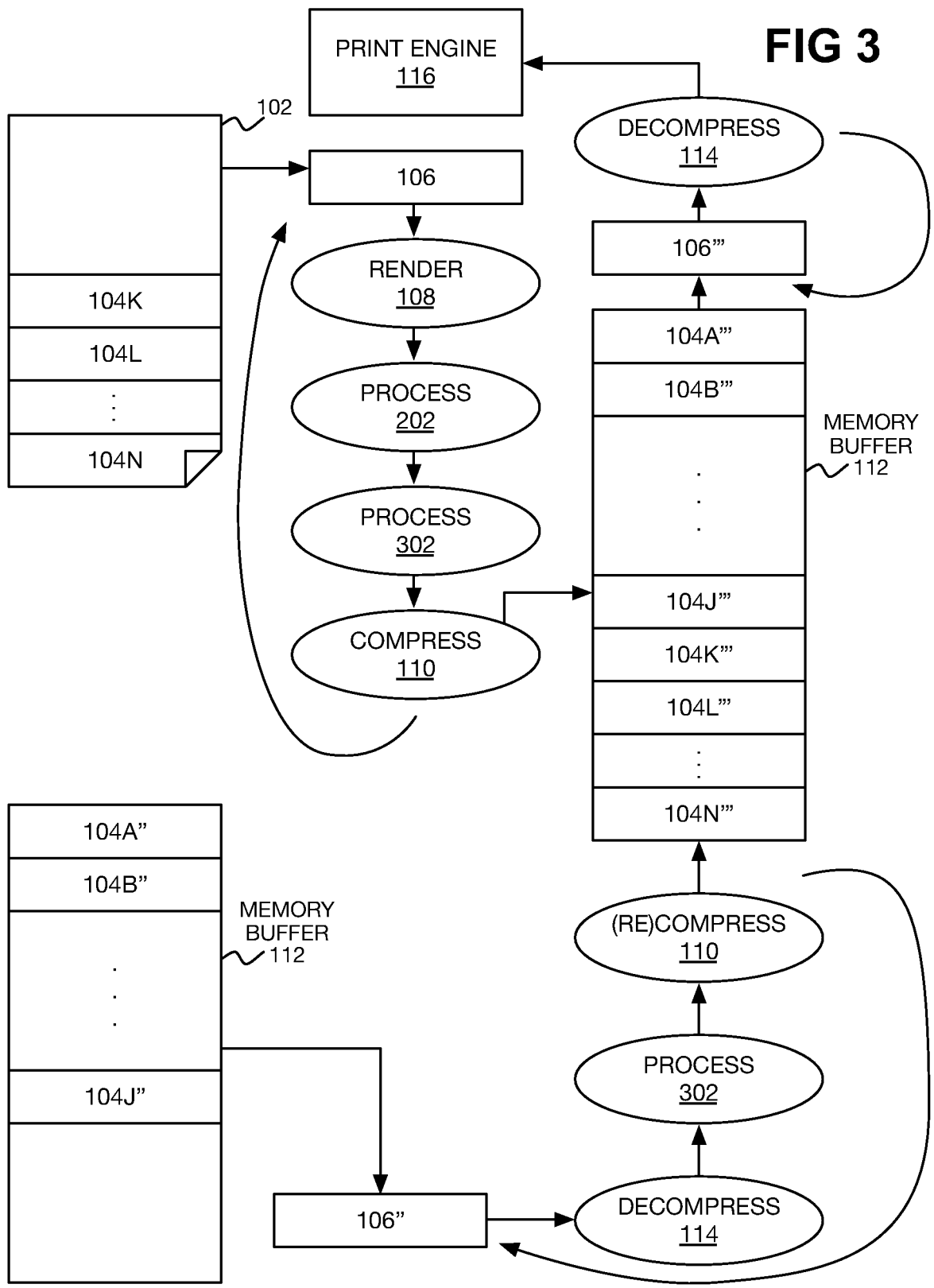
FIG. 3 is a diagram of an example process flow in which a page is printed, after a second low memory condition occurs.

FIG. 3 shows an example process flow for printing the incoming page 102 when a second low memory condition of the memory buffer 112 occurs. That is, a first low memory condition occurs during the process of FIG. 1, resulting in the process of FIG. 2 being performed. Then, during the process of FIG. 2, another low memory condition occurs, resulting in the process of FIG. 3 being performed. In the example of FIG. 3, the memory buffer 112 has reached a low memory condition after compressed, processed, and rendered page strips 104A", 104B", ..., 104J" have been stored in the buffer 112, per the process of FIG. 2. That is, the memory buffer 112 may have insufficient available free space to store the next page strip 104K of the page 102 after or if the page strip 104K is rendered, compressed, and processed in accordance with FIG. 2.

Therefore, the already compressed, processed, and rendered page strips 104A", 104B", ..., 104J" are successively retrieved from the memory buffer 112 and subject to still additional processing, in order from the strip 104A" to the strip 104J", before being stored back in the buffer 112. The current such compressed, processed, and rendered page strip 106" is thus retrieved from the memory buffer 112, decompressed (114), subjected to still additional processing (302), and (re)compressed (110), before being stored back in the memory buffer 112. The additional processing of 302 is in addition to and can be different than the processing of part 202 of FIG. 2.

The additional processing of part 302 can include converting the 600×400 DPI (one-bpp) halftoned page strip to a 300×400 DPI (one-bpp) halftoned page strip. That is, the additional processing of part 302 can include a reduction in resolution, such as by 50% along the horizontal direction. As the page strips 104A", 104B", ..., 104J" are decompressed, processed again, and recompressed, the strips are stored as the compressed, twice-processed, and rendered page strips 104A'", 104B'", ..., 104J'", respectively. The phrase "twice-processed" refers to the first processing of part 202 of FIG. 2 and the second processing of part 302 of FIG. 3.

It is noted that each page strip 106", after decompression, corresponds to a page strip 106" of FIG. 2 after the strip 106" has been subjected to the processing of part 202. Therefore, the processing of part 302 is performed on a page strip after it has already been rendered in part 108 and has been processed in part 202. This processed, rendered page strip undergoes additional processing in part 302 to become a twice-processed, rendered page strip, which is then (re)compressed and stored back in the memory buffer 112. The page strip after the processing of part 302 is smaller in size, and thus takes up less space in the memory buffer 112, then before this processing.

After the page strips 104A", 104B", ..., 104J" that were previously stored in the memory buffer 112 per FIG. 2 when the low memory condition of the buffer 112 occurred have been processed, the remaining pages strips 104K, 104L, ..., 104N of the page 102 can then be processed. The page strips 104K, 104L, ..., 104N are successively processed in order from the page strip 104K to the page strip 104N before being stored in the memory buffer 112. The current such page strip 106 is thus rendered (108) as in FIG. 1, is subjected to the additional processing (202) of FIG. 2, and before being compressed, is also subjected to the still additional processing (302) that has been described. As the page strips 104K, 104L, ..., 104N are so rendered, twice processed, and compressed, the strips are stored as the compressed, twice-processed, and rendered strips 104K", 104L", ..., 104N", respectively.

It is noted that the page strips 104K, 104L, ..., 104N do not undergo compression (or decompression) between when they are rendered in part 108 and when they are processed in part 202, or between when they are processed in part 202 and when they are processed in part 302. This is unlike the preceding page strips 104. For instance, the page strips 104A", 104B", ..., 104J" were stored in the memory buffer 112 after they were processed in part 202 of FIG. 2 and (re)compressed in part 110 per the process of FIG. 2; before they are processed in part 302 in the process of FIG. 3, the page strips 104A", 104B", ..., 104J" are decompressed in part 114 of FIG. 3.

Once the page strips 104K, 104L, ..., 104N of the page 102 have been rendered, twice-processed, and compressed in parts 108, 202, 302, and 110, and then stored in the memory buffer 112, the page 102 can actually be printed. The compressed, twice-processed, and rendered page strips 104'" are successively retrieved in order from the first page strip 104A'" to the last page strip 104N'" from the memory buffer 112. A current compressed, twice-processed, and rendered page strip 106'" is thus decompressed (114), and transmitted to the print engine 116 for printing.

Figure 4:
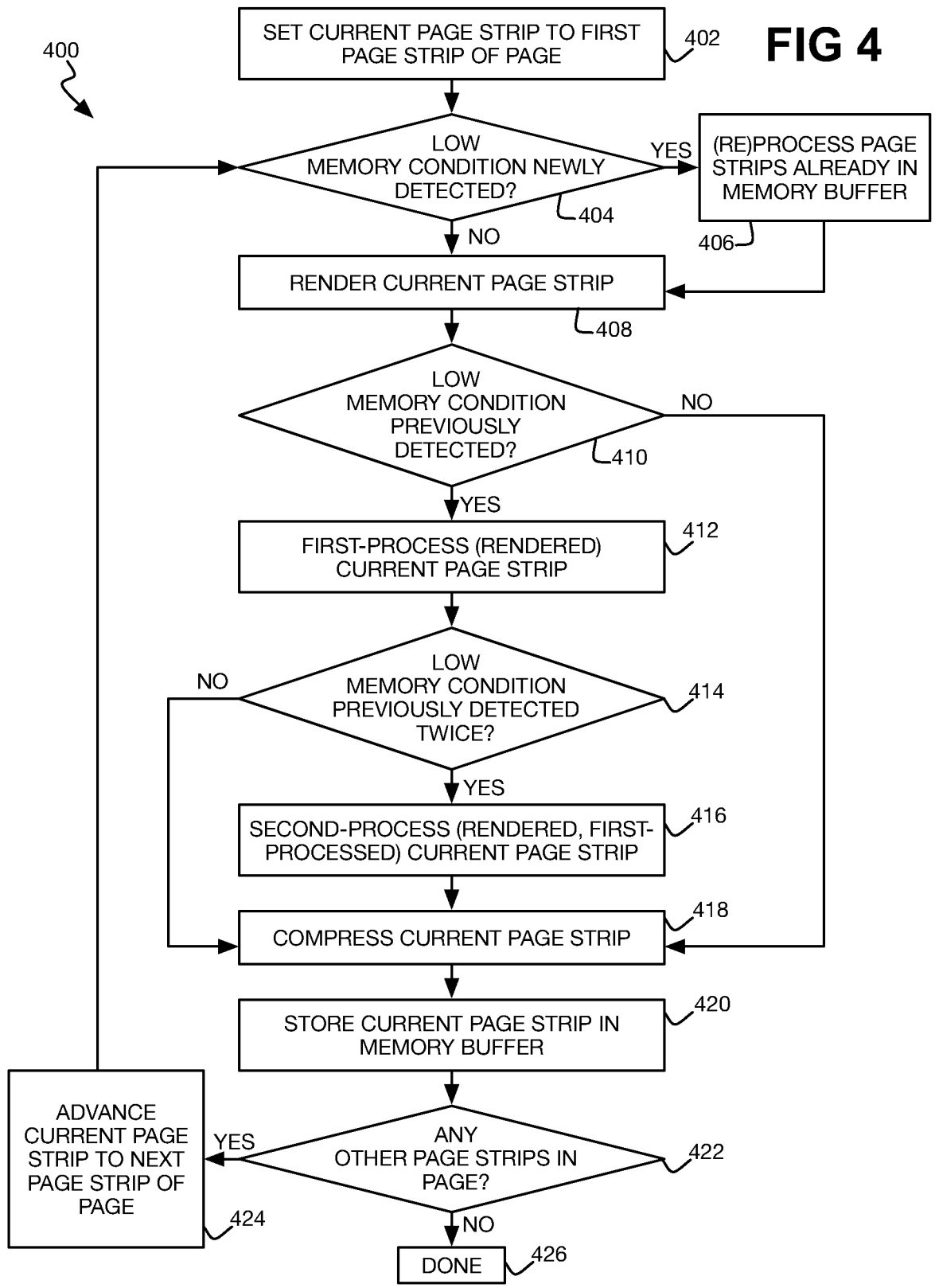
FIG. 4 is a flowchart of an example method for preparing the page strips of a page for printing by a printing device.

FIG. 4 shows an example method 400 for preparing an incoming page for printing by a print engine of a printing device. The method 400 converts the page, on a page strip-by-page strip basis, to a form understandable by the print engine, and compresses the page strips as converted before storing them in a memory buffer, from which the page strips can then be retrieved and decompressed when the print engine is ready to print the page in question. The method 400 can be performed by the printing device itself upon receipt of a print job including the page, or can be performed at least in part by a host device, such as a computing device like a computer (in which case the memory buffer itself may still be part of the printing device). The method 400 can thus at least in part be implemented as a non-transitory computer-readable data storage medium storing program code executable by a processor of a device like a printing device or a computing device.

The current page strip to be processed is initially set to the first page strip of the page (402). If a low memory condition of the memory buffer of the printing device is newly detected (404), then any page strips of the page in relation to which the method 400 has already been performed and that have been stored in compressed form in the memory buffer are (re)processed (406). An example as to how such compressed page strips already stored in the memory buffer can be (re)processed in part 406 is described later in the detailed description, in relation to FIG. 5.

The low memory condition of the memory buffer can be detected in one implementation when there is insufficient available free space in the buffer to store another page strip of the page, or in another manner. For instance, the low memory condition can be predictively detected. For the current page strip to be processed, an average of the compression rate of previously processed page strips on the same or different page may be used to predict the size of the current page strip after compression. If, upon comparing this predicted size to the available free space in the buffer, it is determined that the predicted size is greater than the available free space, or greater than a percentage of the available free space, then the low memory condition is detected. As another example, detecting whether a low memory condition has occurred may not be performed until after a certain percentage of the page strips of the current page have been processed, so that there is an adequate number of page strips on which to determine the average compression rate.

If the low memory condition of the memory buffer has not been newly detected, such that there is currently sufficient available free space in the buffer to store another page strip of the page (404), then the current page strip is rendered (408). The current page strip is also rendered in part 408 after page strips of the page already stored in the memory buffer have been (re)processed in part 406. As has been noted, rendering of the current page strip can include halftoning the strip to 600×400 DPI two-bpp grayscale. More generally, rendering subjects the current page strip to a J×K-resolution, N-bpp halftoning technique.

If a low memory condition was previously detected at least once (410), then the (rendered) current page strip is also processed (412), which is referred to herein as first processing. A low memory condition of the memory buffer is said to have been previously detected if such a low memory condition was detected in the current or any prior iteration of the method 400 with respect to the page of which the current page strip is a part. Thus, a low memory condition is said to have been previously detected if the current page strip was rendered in part 408 after already stored page strips have been (re)processed in part 406. A low memory condition is also said to have been previously detected if the method 400 proceeded directly from part 404 to part 408 to render the current page strip, but had previously proceeded directly from part 406 to part 408 to render a prior page strip.

The first processing of part 412 can include reducing the bpp of the current page strip, such as from two-bpp grayscale to one bpp. For instance, the 600×400 DPI two-bpp grayscale rendered current page strip can be reduced to a 600×400 DPI one-bpp grayscale rendered strip. More generally, the first processing of part 412 is a memory utilization reduction technique in which the page strip is smaller in size (and thus takes up less storage space in the memory buffer) after first processing than before. If the (rendered) current page strip is said to be an N-bpp page strip, then the first processing may be an M<N-bpp conversion technique, such that after first processing the page strip is an M-bpp page strip.

If a low memory condition was previously detected twice (414), then the first-processed, rendered current page strip undergoes second processing (416), which can be different than the first processing of part 412. A low memory condition of the memory buffer is said to have been previously detected twice if in two iterations of the method 400 (which can include the current iteration, as to the current page strip), the method 400 proceeded to part 408 directly from part 406. The second processing of part 416 can include reducing the resolution of the current page strip, such as from 600×400 DPI to 300×400 DPI. For instance, the 600×400 DPI one-bpp grayscale first-processed and rendered current page strip can be reduced in resolution to a 300×400 DPI one-bpp strip. More generally, the second processing of part 416 is an additional memory utilization reduction technique in which the page strip is smaller in size after second processing than before. If the (first-processed and rendered) current page strip is said to have a resolution of J×K, then the second processing may be an F×G-resolution sampling technique, where F<J and/or G<K.

After undergoing the second processing in part 416, the current page strip is compressed (418), and stored in the memory buffer (420). The current page strip is also compressed in part 418 and stored in the memory buffer directly after having been first-processed in part 412 if a low memory condition had not previously occurred twice (such that the method 400 proceeds from part 414 to part 418). The current page strip is similarly compressed in part 418 and stored in the memory buffer directly after having been rendered in part 408 if no low memory condition has previously occurred (such that the method 400 proceeds from part 410 to part 418).

Therefore, there are three scenarios in the method 400. If no low memory condition has occurred, then the current page strip is rendered in part 408, and then compressed in part 418 and stored in the memory buffer in part 420, per the process of FIG. 1 that has been described. If the low memory condition has previously occurred once, then the current page strip is rendered in part 408 and first-processed in part 412, before being compressed in part 418 and stored in the memory buffer in part 420, per the process of FIG. 2 that has been described. If the low memory condition has previously occurred twice, then the current page strip is rendered in part 408, first-processed in part 412, and second-processed in part 416, before being compressed in part 418 and stored in the memory buffer in part 420, per the process of FIG. 3 that has been described.

Once the current page strip has been stored in the memory buffer, if the page has any other page strips that have yet to be processed per the method 400 (422), then the current page strip is advanced to the next page strip on the page (424), and the method 400 is repeated at part 404. Otherwise, the method 400 is finished (426). When the method 400 is finished, the page is ready to be printed by the print engine of the printing device.

Figure 5:
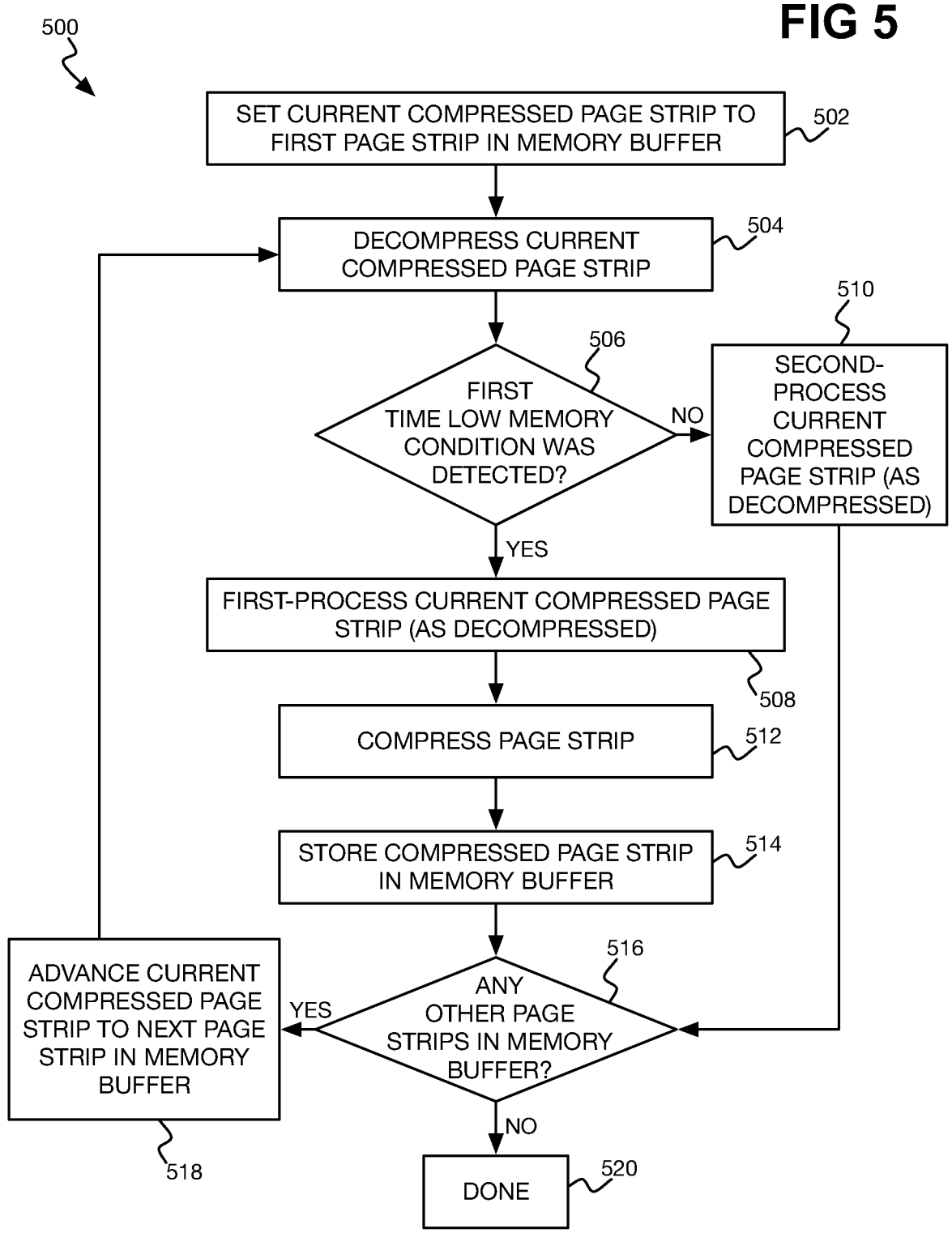
FIG. 5 is a flowchart of an example method for processing page strips of a page that have already been compressed and stored in a memory buffer, subsequent to a low memory condition being detected.

FIG. 5 shows an example method 500 for processing compressed page strips of a page to be printed that have already been stored in the memory buffer. The method 500 can thus be performed as part 406 of the method 400. That is, when a low memory condition has been newly detected, processing of the current page strip of the page is paused, and the previously processed page strips are processed. Therefore, the method 500 in effect is performed in relation to any page strip that has been previously compressed in part 418 and stored in the memory buffer in part 420 of the method 400.

What is referred to as the current compressed page strip is set to the first page strip of the page stored in the memory buffer (502). The current compressed page strip is not to be confused with the current page strip that has been described in relation to the method 400. The current compressed page strip is retrieved from the memory buffer and decompressed (504).

If the method 500 is being performed for the first time with respect to the current page—i.e., if the method 500 is being performed due to the first time the low memory condition was detected while processing the current page (506)—then the page strip decompressed in part 504 is first-processed (508). The first processing that is performed in part 508 is the first processing that has been described in part 412 of the method 400. By comparison, if the method 500 is being performed for the second time with respect to the current page—i.e., if the method 500 is being performed due to the second time the low memory condition was detected while processing the current page (506)—then the page strip decompressed in part 506 is second-processed (510). The second processing that is performed in part 510 is the second processing that has been described in part 416 of the method 400.

When a decompressed page strip is first-processed in part 508, the page strip will have already been rendered. That is, prior to the low memory condition being detected for the first time in part 404, page strips are rendered in part 408, compressed in part 418, and stored in part 420 of the method 400. Therefore, when such a current compressed page strip is retrieved and decompressed in part 504, the result is a rendered page strip, which is then subjected to first processing in part 508.

By comparison, when a decompressed page strip is second-processed in part 510, the page strip will have already been rendered and first-processed. That is, prior to the low memory condition being detected for the second time in part 404, page strips are rendered in part 408, first-processed in part 412, compressed in part 418, and stored in part 420 of the method 400. Therefore, when such a current compressed page strip is retrieved and decompressed in part 504, the result is a first-processed, rendered page strip, which is then subjected to second processing in part 510.

After the page strip is first-processed in part 508 or second-processed in part 510, the strip is (re)compressed (512), and stored back in the memory buffer (514). If there are any other compressed page strips of the page stored in the memory buffer that have yet to be processed per the method 500 (516), then the current compressed page strip is advanced to the next compressed page strip in the memory buffer (518), and the method 500 is repeated at part 504. Otherwise, the method 500 is finished (520).

When the method 500 is finished, there can be one of two results. First, if the method 500 has been performed responsive to the first time a low memory condition occurred, then the page strips that were previously rendered, compressed, and stored in the memory buffer per the method 400 are decompressed, subjected to first processing, (re)compressed, and stored back in the memory buffer. The method 400 can then continue, where the other page strips of the page are rendered, first-processed, compressed, and stored in the memory buffer.

Second, if the method 500 has been performed responsive to the second time a low memory condition occurred, then the page strips that were previously rendered, first-processed, compressed, and stored in the memory buffer per the method 400 are decompressed, subjected to second processing, (re)compressed, and stored back in the memory buffer. The method 400 can then continue, where the other page strips are rendered, first-processed, second-processed, compressed, and stored in the memory buffer. The method 500 is performed, therefore, so that page strips already in the memory buffer are processed again such that they will have been processed in the same way that the other page strips that are not yet in the memory buffer will be processed.

Figure 6:
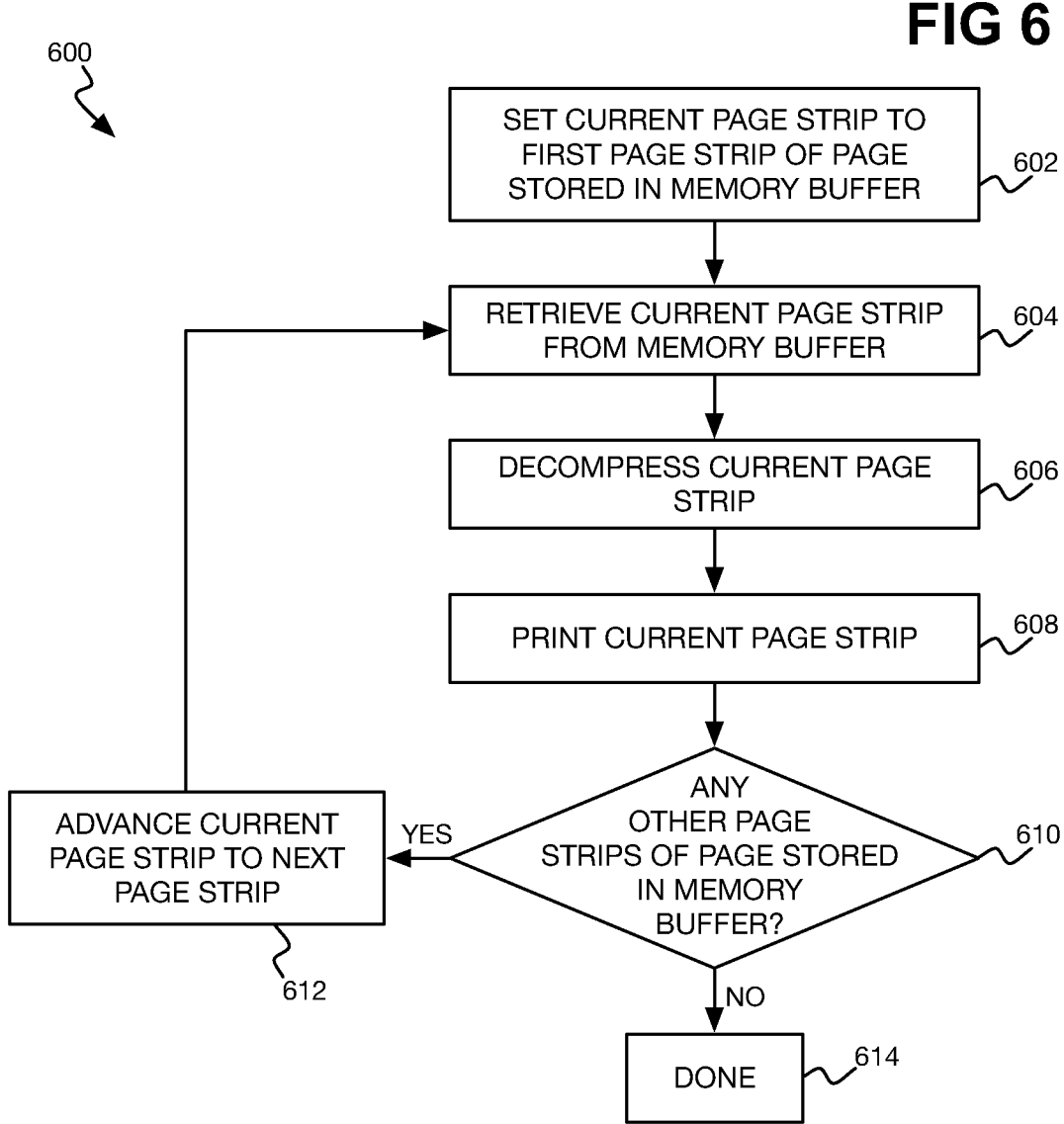
FIG. 6 is a flowchart of an example method for printing the prepared page strips of a page by a printing device.

FIG. 6 shows an example method 600 for printing a page after the page strips thereof have been processed, compressed, and stored in a memory buffer, such as in accordance with the method 400. A current page strip is set to the first page strip of the page stored in the memory buffer (602). The current page strip is retrieved from the memory buffer (604), decompressed, and printed by a print engine (608). For instance, the decompressed page strip may be transmitted to the print engine. If there are other page strips for the page remaining in the memory buffer (610), then the current page strip is advanced to the next page strip in the buffer (612), and the method 600 is repeated at part 604. Otherwise, the method 600 is finished (614).

Figure 7:
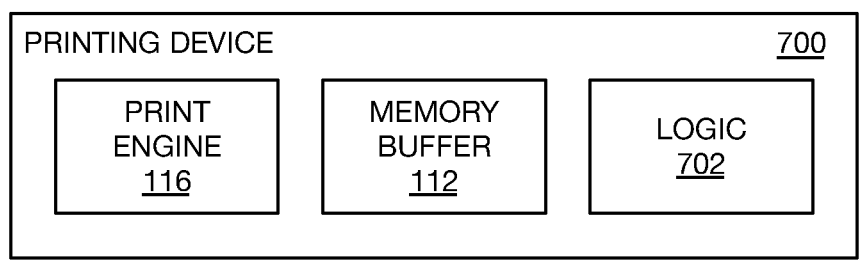
FIG. 7 is a diagram of an example printing device.

FIG. 7 shows an example printing device 700, such as a standalone printer, or an all-in-one (AIO) or multifunction printer (MFP) devices having printing functionality. The printing device includes the print engine 116 and the memory buffer 112 that have been described. The print engine 116 can thus be a monochromatic laser-printing engine, or another type of print engine. The memory buffer 112 can be implemented in volatile memory, such as a dynamic random-access memory (DRAM).

The printing device 700 also includes logic 702. The logic 702 can perform the processes of FIGS. 1 and 2 and the methods of FIGS. 3, 4, 5, and 6 that have been described. The logic 702 is implemented at least in hardware. For instance, the logic 702 may include a processor and a non-transitory computer-readable data storage medium storing program code that the processor executes to performs the processes and methods that have been described. In this respect, it is said that the logic 702 can be implemented as an application-specific integrated circuit (ASIC), for example, which is programmed to perform these processes and methods. The rendering, first processing, second processing, and compression/decompression functionality that have been described may be part of the same or different ASICs.

The techniques that have been described thus ensure that a page can be printed even if its page strips cannot normally be completely stored in a memory buffer, such as one of limited size. This is achieved by reducing the size of the page strips that have already been processed and stored in the memory buffer, as well as by subjecting subsequent page strips to the same processing resulting in the size reduction. Therefore, a memory buffer can be sized to fit a page of above average or even average page strips in complexity (and thus size), such that one or more memory utilization reduction techniques are employed in those instances in which the page strips are of unordinary or extraordinary complexity.

We claim:

1. A method comprising: detecting a low memory condition of a memory buffer storing a plurality of already processed and compressed first strips of a page, the first strips processed according to a rendering technique; responsive to detecting the low memory condition, decompressing, reprocessing, compressing, and storing the first strips in the memory buffer, the first strips reprocessed according to a memory utilization reduction technique; and processing, compressing, and storing a plurality of additional, second strips of the page in the memory buffer, the second strips processed according to the rendering technique and then according to the memory utilization reduction technique; again detecting the low memory condition of the memory buffer; responsive to again detecting the low memory condition, decompressing, reprocessing, compressing, and storing the first and second strips in the memory buffer, the first and second strips reprocessed according to an additional memory utilization reduction technique; and processing, compressing, and storing a plurality of additional, third strips of the page in the memory buffer, the third strips processing according to the rendering technique, then according to the memory utilization reduction technique, and then according to the additional memory utilization reduction technique.

2. The method of claim 1, further comprising:
decompressing the first and second strips of the page from the memory buffer; and printing, by a print engine, the decompressed first and second strips of the page, wherein the page is divided over the first and second strips.

3. The method of claim 1, further comprising:

prior to detecting the low memory condition, processing, compressing, and storing the first strips of the page in the memory buffer, the first strips processed according to the rendering technique.

4. The method of claim 1, further comprising: decompressing the first, second, and third strips of the page from the memory buffer; and printing, by a print engine, the decompressed first, second, and third strips of the page, wherein the page k divided over the first, second, and third strips.

5. The method of claim 1, wherein the third strips are processed according to the memory utilization reduction technique without being compressed after having been processed according to the rendering technique, and are processed according to the additional memory utilization reduction technique without being compressed after having been processed according to the memory utilization reduction technique.

6. The method of 1, wherein the rendering technique comprises a JxK-resolution, N-bit per pixel (bpp) halftoning technique, the memory utilization reduction technique comprises a M<N-bpp conversion technique, and the additional memory utilization reduction techniques comprises an FxG-resolution sampling technique, wherein one or more of F<J and G<K.

7. The method of claim 1, wherein detecting the low memory condition comprises:

determining that an amount of free space of the memory buffer is insufficient to store one more strip of the page after the one more strip is processed according to the rendering technique and compressed.

8. The method of claim 1, wherein detecting the low memory condition of the memory buffer comprises:

comparing an amount of free space of the memory buffer to a predicted size of a current strip of the page after compression according to a compression rate of previously compressed strips.

9. The method of claim 1, wherein the second strips are processed according to the memory utilization reduction technique without being compressed after having been processed according to the rendering technique.

10. The method of claim 1, wherein the rendering technique comprises a N-bit per pixel (bpp) halftoning technique, and the memory utilization reduction technique comprises a M<N-bpp conversion technique.

11. A non-transitory computer-readable data storage medium storing program code executable by a printing device to: successively render, compress, and store in a memory buffer a plurality of strips of a page until a low memory condition of the memory buffer occurs; responsive to occurrence of the low memory condition, decompress, process, compress and store in the memory buffer the strips that were already rendered when the low memory condition occurred; and after the occurrence of the low memory condition, render, process, compress, and store in the memory buffer the strips that were not already rendered when the low memory condition occurred; wherein the program code is executable by the printing device to further: responsive to a second occurrence of the low memory condition, decompress, progress again, compress, and store in the memory buffer the strips that were already rendered and processed when the low memory condition again occurred; and after the second occurrence of the low memory condition, render, process, process again, compress, and store in the memory buffer the strips that were not already rendered and processed when the low memory condition again occurred.

12. A printing device comprising: a print engine to print a page; a memory buffer to store a plurality of strips of the page in a compressed manner until the print engine is ready to print the page; and logic implemented at least in hardware to: process according to a rendering technique and compress the strips of the page before storing the strips in the memory buffer, until a low memory condition of the memory buffer occurs; responsive to occurrence of the low memory condition, decompress and process according to a memory utilization reduction technique, and compress the strips already stored in the memory buffer when the low memory condition occurred; and after the occurrence of the low memory condition, process according to the rendering technique and then according to the memory utilization reduction technique, compress, and store in the memory buffer the strips of the page that were not already stored in the memory buffer when the low memory condition occurred;

wherein the logic is further to: responsive to a second occurrence of the low memory condition, decompress, process according to an additional memory utilization reduction technique, and compress the strips already stored in the memory buffer when the low memory condition occurred again; and after the second occurrence of the low memory condition, process according to the rendering technique, then according to the memory utilization reduction technique, and then according to the additional memory utilization reduction technique, compress, and store in the memory buffer the strips that were not already stored in the memory buffer when the low memory condition occurred again.

* * * * *